(12) United States Patent
Ding et al.

(10) Patent No.: US 10,136,195 B2
(45) Date of Patent: Nov. 20, 2018

(54) UPGRADEABLE DISTRIBUTION FRAMEWORK, CABLE CONNECTOR, AND CABLING MANAGEMENT SYSTEM

(71) Applicant: Corning Research & Development Corporation, Corning, NY (US)

(72) Inventors: Min Ding, Shanghai (CN); Jian Wei, Shanghai (CN); Hong Lu, Shanghai (CN); Yanhong Yang, Shanghai (CN); Zheng Huang, Shanghai (CN); Xiaoyang Bai, Shanghai (CN); Zhijun Yang, Shanghai (CN)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/531,891

(22) PCT Filed: Nov. 19, 2015

(86) PCT No.: PCT/US2015/061575
§ 371 (c)(1),
(2) Date: May 31, 2017

(87) PCT Pub. No.: WO2016/089611
PCT Pub. Date: Jun. 9, 2016

(65) Prior Publication Data
US 2017/0272841 A1    Sep. 21, 2017

(30) Foreign Application Priority Data

Dec. 1, 2014   (CN) .......................... 2014 1 0718826

(51) Int. Cl.
*H01R 3/00*  (2006.01)
*H04Q 1/14*  (2006.01)
(Continued)

(52) U.S. Cl.
CPC ............... *H04Q 1/14* (2013.01); *G06K 19/07* (2013.01); *H01R 13/44* (2013.01); *H01R 13/64* (2013.01);
(Continued)

(58) Field of Classification Search
CPC ............................ H04Q 1/136; H04Q 1/138
(Continued)

(56) References Cited

U.S. PATENT DOCUMENTS 5,764,043 A * 6/1998 Czosnowski ........ G02B 6/3807
                                                          324/149
6,784,802 B1    8/2004 Stanescu
(Continued)

FOREIGN PATENT DOCUMENTS

CN        202514032 U    10/2012
CN        203799077 U     8/2014
(Continued)

OTHER PUBLICATIONS

Search Report for CN Appl. No. 201410718826.1, dated Sep. 1, 2017, 1 pg.
(Continued)

*Primary Examiner* — Neil Abrams
(74) *Attorney, Agent, or Firm* — Brad C. Rametta (57) ABSTRACT

An upgradeable distribution framework, cable connector and cabling management system is described. The distribution framework has a plurality of ports adapted to be connected by cable connectors and indicator elements arranged on the distribution framework wherein corresponding to at least a portion of the ports. A plurality of first communication units are detachably secured to the cable connectors and such that the first communication units are positioned outside the ports when the cable connectors are inserted into the ports. The distribution framework further (Continued)

includes a plurality of second communication units that correspond to at least a portion of the ports. The second communication units and the corresponding first communication units are configured to communicate with each other in a non-contact manner. A control modules is configured to control and read and write communications between at least a portion of the first communication units and the second communication units.

19 Claims, 7 Drawing Sheets

(51) Int. Cl.
| | |
|---|---|
| *H04Q 1/02* | (2006.01) |
| *G06K 19/07* | (2006.01) |
| *H01R 13/44* | (2006.01) |
| *H04Q 1/06* | (2006.01) |
| *H01R 13/64* | (2006.01) |
| *H01R 24/64* | (2011.01) |

(52) U.S. Cl.
CPC ............... *H01R 24/64* (2013.01); *H04Q 1/02* (2013.01); *H04Q 1/06* (2013.01)

(58) Field of Classification Search
USPC .................................................. 439/489, 490
See application file for complete search history.

(56) References Cited

U.S. PATENT DOCUMENTS

| | | | | |
|---|---|---|---|---|
| 7,605,707 | B2 * | 10/2009 | German | H01R 13/465 |
| | | | | 340/572.7 |
| 8,092,249 | B2 * | 1/2012 | German | H04Q 1/138 |
| | | | | 439/489 |
| 8,128,428 | B2 * | 3/2012 | Caveney | H04Q 1/149 |
| | | | | 439/490 |
| 8,142,221 | B2 * | 3/2012 | Malstron | H01R 13/665 |
| | | | | 439/489 |
| 8,421,626 | B2 * | 4/2013 | Downie | G06K 19/0717 |
| | | | | 340/10.1 |
| 9,007,206 | B2 * | 4/2015 | Chen | H04Q 1/13 |
| | | | | 340/540 |
| 9,049,499 | B2 * | 6/2015 | Nordin | H04Q 1/136 |
| 9,076,241 | B2 * | 7/2015 | Fan | H04Q 1/136 |
| 9,196,999 | B2 * | 11/2015 | Shifris | H01R 13/465 |
| 9,380,358 | B2 * | 6/2016 | Caveney | H04Q 1/138 |
| 9,444,686 | B2 * | 9/2016 | Jacks | H01R 13/641 |
| 9,500,817 | B2 * | 11/2016 | Coffey | G02B 6/36 |
| 9,924,241 | B2 * | 3/2018 | Shih | H04Q 1/136 |
| 2007/0020976 | A1 | 1/2007 | Tirtosupono | |
| 2009/0298350 | A1 | 12/2009 | Scislak | |
| 2010/0098425 | A1 | 4/2010 | Kewitsch | |
| 2013/0076589 | A1 | 3/2013 | Caveney | |
| 2013/0260602 | A1 | 10/2013 | German | |
| 2014/0250495 | A1 | 9/2014 | Nahanfar et al. | |
| 2017/0315167 | A1 * | 11/2017 | Bai | H04Q 1/136 |

FOREIGN PATENT DOCUMENTS

| | | |
|---|---|---|
| CN | 203799078 U | 8/2014 |
| CN | 203799401 U | 8/2014 |
| CN | 203930122 U | 11/2014 |
| JP | 2009-157904 | 7/2009 |
| JP | 2012-098538 | 7/2012 |
| JP | 2016-086793 | 6/2016 |

OTHER PUBLICATIONS

International Search Report for PCT International Application No. PCT/US2015/061575, dated Feb. 29, 2016, 3 pages.
EP15866176.9 Office Action and Search Report dated Jun. 29, 2018, European Patent Office.

* cited by examiner

UPGRADEABLE DISTRIBUTION FRAMEWORK, CABLE CONNECTOR, AND CABLING MANAGEMENT SYSTEM

TECHNICAL FIELD

The present invention relates to the field of cabling management technologies, and in particular, relates to an upgradeable cabling management system, distribution framework, and cable connector for use in the distribution framework.

BACKGROUND

With the development and popularity of the broadband networks, network managers are subjected to management of large-scale or even super-large-scale network cabling. At present, in such application scenarios as telecommunication equipment rooms and datacenters, distribution frameworks mainly employ a cross connection mode and a direct connection mode. The cross connection mode refers to a connection mode where two distribution frameworks are used to implement link connections from switches to end users. In this mode, ports at the rear end of one distribution framework are respectively connected to the corresponding ports on the switch, and ports at the rear end of the other distribution framework are respectively connected to the corresponding ports of the end users; and the two distribution frameworks employ a jumpering manner to implement connection of the entire link. The direct connection mode refers to a connection mode where one distribution framework is employed to implement link connections from a switch to end users. In this mode, one end of the jumper is directly connected to the switch and the other end of the jumper is connected to the front end of the distribution framework, and the rear end of the distribution framework is then connected to the end users. However, regardless of which mode, management of the cabling system falls behind the network development.

In the traditional cabling management system, port information needs to be written on paper and then manually recorded in a background management computer. During this process, it is very common that the practical connection is inconsistent with the information recorded in the background management computer due to human mistakes. In addition, in such application scenarios as telecommunication equipment rooms and datacenters, cabling is very chaotic, and thus it is hard to accurately know the usage ratio of the ports in a telecommunication equipment room. For example, it is hard to figure out which ports are being used and which ports are not used. In particular, when the overall cabling is subjected to a change, network connections between the switch and the distribution framework need to be changed, and during this process, mistakes may readily occur.

To solve the above technical problem, technical solutions addressing intelligent cabling management have been proposed.

One currently prevailing solution is a contact-type intelligent cabling management system. In this technical solution, special 9-pin or 10-pin cables or adapters are used. However, such special cables and adapters increase the replacement costs and difficulty for the users.

Alternatively, non-contact technical solutions using the radio frequency identification (RFID) technology exist. However, in most technical solutions based on the RFID technology, the RFID tags are directly disposed in a connector of the jumper. In these technical solutions, if the RFID tag is damaged and needs to be replaced with a new one, the tag-equipped cable also needs to be replaced, which increases the cost and causes a waste of cable resources. Another issue arises when the RFID technology is used in a metal shielding adapter, since the RFID signals from a tag disposed in a connector are shielded by the metal and can cause a communications failure between the RFID reader and the RFID tag.

In addition, conventional intelligent cabling management systems generally employ designs in which an active control module and passive distribution framework are integrated. So, if the user does not plan for the use of the intelligent cabling management in the initial design stage but desires to switch to the intelligent cabling management system with an upgrade of the system, no upgrade may be possible based on the initial system. The only way to upgrade the system in this case would be to interrupt the network connections and then replace all the distribution frameworks in the telecommunication equipment room. This not only increases the cost but also causes inconvenience for use.

In view of the above, an improved cabling management system and an upgradeable distribution framework is desired.

SUMMARY

The present invention is directed to overcoming or reducing at least one or more technical problems in the related art.

At least one objective of the present invention is to provide an improved cabling management system, which is capable of adding, reducing and replacing communication units of a cable connector at a port on a distribution framework, without interrupting the network connection.

Another objective of the present invention is to provide an improved cabling management system, which is capable of overcoming the defect in the related art of communication units in a cable connector that are subjected to signal shielding by a metal adapter.

A further objective of the present invention is to provide an improved cabling management system, where communication signals are reliable and stable, maintenance cost is low, and installation and use are convenient.

Still another objective of the present invention is to provide a cable connector, which is capable of overcoming the defect in the related art that communication units in a cable connector are subjected to signal shielding by a metal adapter.

Another objective of the present invention is to provide an upgradeable distribution framework, which is capable of adding, reducing and replacing of communication units of a cable connector at a port on a distribution framework, without interrupting network connection.

Still another objective of the present invention is to provide an upgradeable distribution framework, which is capable of overcoming the defect in the related art that communication units in a cable connector are subjected to signal shielding by a metal adapter.

A further objective of the present invention is to provide an upgradeable distribution framework, where communication signals are reliable and stable, maintenance cost is low, and installation and use are convenient.

According to a first aspect of the present invention, a cabling management system is provided, comprising: a distribution framework having a plurality of ports adapted to be connected to a cable connector, wherein corresponding to at least a portion of the ports, indicator elements adapted to indicate an interconnection state of the corresponding ports with the cable connector are arranged on the distribution framework; a plurality of first communication units respectively detachably secured to the corresponding cable connector and such configured that the first communication unit is positioned outside the port when the cable connector is inserted into the port; a plurality of second communication units, at least a portion of the second communication units respectively correspond to one of the ports, the second communication unit and the corresponding first communication unit being configured to communicate with each other in a non-contact manner; and one or a plurality of control modules configured to control and read and write communications between at least a portion of the first communication units and the second communication units.

Further, corresponding to the at least a portion of the ports, installation openings are arranged on the distribution framework, the installation openings being arranged at lower parts or upper parts of the ports and spaced apart at a specific distance from the ports.

To be specific, the cable connector is provided with a jacket detachably secured to the cable connector; and the first communication units are secured to a bottom plate of the jacket, the bottom plate passing through the installation openings at the corresponding ports. More particularly, the jacket comprises a receiving structure such configured that the cable connector is at least partially received in the receiving structure.

In some specific embodiments, a pair of detachably connected jackets is provided for a cable having the cable connector at both ends, the pair of jackets being respectively provided with a pair of the first communication units mating with each other. For example, one of the pair of jackets is provided with a columnar opening and/or a columnar portion that are insertable into a columnar portion and/or a columnar opening on the other of the pair of jackets.

Further, the control module comprises a read-write circuit and a control circuit; wherein: the read-write circuit is connected to the plurality of second communication units and configured to read information from the first communication units and/or write information into the first communication units; and the control circuit is connected to the read-write circuit and configured to control communications between the second communication units and the first communication units, and control information reading and writing by the read-write circuit for the first communication units.

To be specific, the control module and the second communication unit are detachably secured to the distribution framework. In some specific embodiments, the control module and the second communication unit are arranged on an installation plate, the installation plate being detachably secured to the distribution framework. In some specific embodiments, the control circuit is further configured to control enabling and disabling of the indicator elements.

In some specific embodiments, the first communication unit is a radio frequency identification tag, and the second communication unit is a radio frequency identification antenna. Preferably, the second communication unit and/or the first communication unit are further provided with a signal strengthening element. For example, the signal strengthening element comprises a ferrite layer.

The cabling management system according to the embodiments of the present invention may further comprise a control unit, wherein the control unit communicates with the control module and is configured to perform management of the control module. In some specific embodiment, the control unit may be further configured to supply power for the indicator element and the control module.

The cabling management system according to the embodiments of the present invention may further comprise a central management unit, wherein the central management unit is configured to control the control unit in a network communication manner and has a human-computer interaction function.

According to a second aspect of the present invention, a cable connector is provided, comprising a body and a jacket, wherein the body is configured to be in communication with a port on a distribution framework to implement data communication, and the jacket is detachably installed on the body of the cable connector.

In some specific embodiments, the jacket comprises a receiving structure and a bottom plate arranged parallel with the receiving structure, wherein the receiving structure is configured to receive at least partially the body of the cable connector in the receiving structure. The bottom plate is provided with a first communication unit, wherein the first communication unit comprises a radio frequency identification tag.

In some specific embodiments, a pair of detachably connected jackets is provided for a cable having the cable connector at both ends, the pair of jackets being respectively provided with a pair of the first communication units mating with each other. For example, one of the pair of jackets is provided with a columnar opening and/or a columnar portion that are insertable into a columnar portion and/or a columnar opening on the other of the pair of jackets.

According to a third aspect of the present invention, an upgradeable distribution framework is provided. The distribution framework has a plurality of ports adapted to be connected to a cable connector. Corresponding to at least a portion of the ports, installation openings and indicator elements adapted to indicate an interconnection state of the corresponding ports with the cable connector are arranged on the distribution framework, wherein the installation openings are arranged at lower parts or upper parts of the ports and spaced apart at a specific distance from the ports.

In some specific embodiments, the installation opening is adapted to pass a portion of a structure corresponding to the jacket of the corresponding port and having the first communication unit through the installation opening, such that the first communication unit is positioned outside the port.

The upgradeable distribution framework according to the embodiments of the present invention further comprises an installation plate and a plurality of second communication units and one or a plurality of control modules that are arranged on the installation plate; wherein: the installation plate is detachably secured to the distribution framework; at least a portion of the second communication units respectively correspond to one of the ports, and the second communication units and the corresponding first communication units are configured to communicate with each other in a non-contact manner; and the control module is configured to control and read and write communications between at least a portion of the first communication units and the second communication units.

The embodiments of the present invention achieve at least the following technical effects.

As seen from the above, according to the intelligent cabling management system, the cable connector, and the upgradeable distribution framework provided in the embodiments of the present invention, when users fail to employ an entire intelligent cabling management system in the initial deployment of the cabling system due to such factors as budgets or technical concepts, the users may use common cables and cable connectors thereof, and the distribution framework having indicator elements and installation openings provided in the embodiments of the present invention, and implement traditional cabling management. This may effectively reduce the costs for the users. Where an intelligent cabling management system is desired in the future, the users only need to install jackets having a first communication unit (radio frequency identification tag) to cable connectors connected to the distribution framework, and meanwhile install control modules having a second communication unit (radio frequency antenna), a read-write circuit, and a control circuit to the distribution framework in a securing manner via a securing member. As such, the users may implement upgrade of the distribution framework without causing an interruption to the network connection. In addition, management and control may be implemented by using a peripheral intelligent control unit and central management unit. In this way, the traditional distribution framework may be conveniently, quickly, reliably, and stably upgraded to the intelligent cabling management system according to the embodiments of the present invention. In addition, since the first communication unit (the radio frequency identification tag) is arranged outside a metal adapter, radio frequency signals may not be shielded by the metal adapter. Further, according to actual needs, a signal strengthening element made of a ferrite material may be additionally arranged on the second communication unit (the radio frequency identification antenna) or the first communication unit, to increase a read-write distance of the radio frequency identification antenna and reduce impacts caused by the metal adapter to the radio frequency signals.

Therefore, the intelligent cabling management system provided in the embodiments of the present invention is capable of performing a large amount of data processing without the need of paper documents, and thus effectively reduces the occurrence rate of man-made errors and the workload. In addition, the intelligent cabling management system provided in the embodiments of the present invention may further monitor states of the ports, and collect statistics for the usage ratio of the ports, thereby fully using the ports. If detecting an unauthorized or exceptional operation, the system may generate a warning to prohibit the exception.

The other objectives and other technical effects that can be achieved by the present invention will be described in the following specific embodiments with reference to the description of the specific embodiments and attached drawings.

BRIEF DESCRIPTION OF THE DRAWINGS

To make the above and other objectives, characteristics, and advantages of the present invention clearly and more understandable, the present invention is described in detail with reference to the attached drawings and specific embodiments.

DETAILED DESCRIPTION

Specific embodiments of the present invention are described hereinafter in detail. Examples in the specific embodiments are illustrated in the attached drawings, wherein the same reference numerals denote the same or like elements. The specific embodiments described with reference to the attached drawings are all exemplary, and are intended to illustrate and interpret the present invention, which shall not be construed as causing limitations to the present invention.

Referring to FIGS. 1 to 8, an embodiment of the present invention provides an intelligent cabling management system, an upgradeable distribution framework, and a cable connector used therefor that are applicable to network cabling.

Figure 1A:
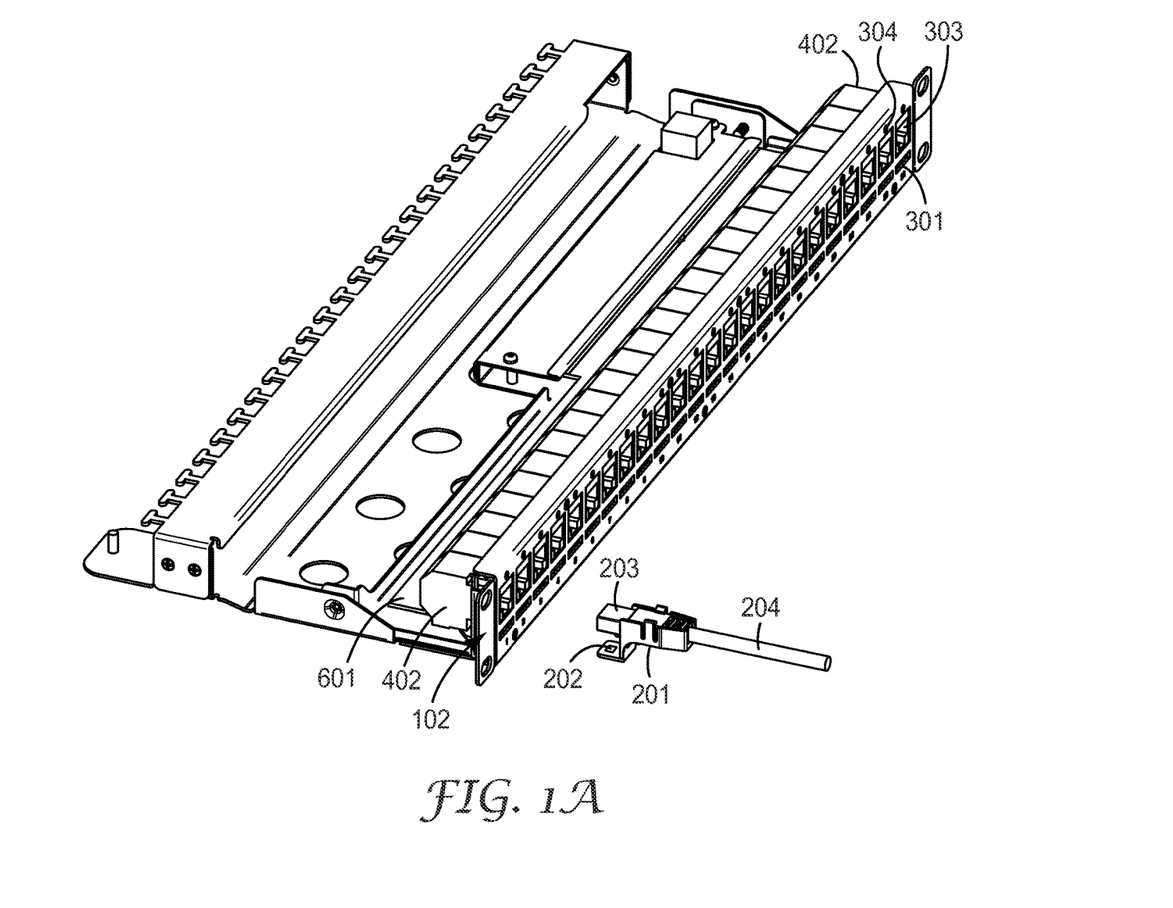
FIG. 1A and FIG. 1B respectively exemplarily illustrate a three-dimensional view and a front view on a distribution framework in a cabling management system according to an embodiment of the present invention.
Figure 1B:
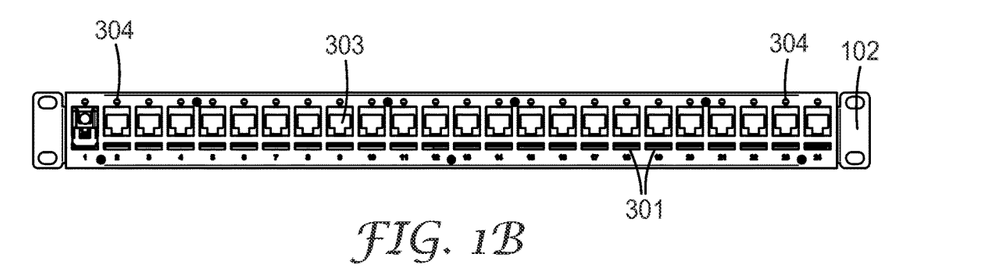

According to the embodiment of the present invention, referring to FIGS. 1A and 1B, the intelligent cabling management system comprises: a distribution framework 102, a plurality of first communication units 202, a plurality of second communication units 401, and one or a plurality of control modules 601. The distribution framework 102 has a plurality of ports 303 adapted to be connected to a cable connector 203, wherein corresponding to at least a portion of the ports 303, indicator elements 304 (for example, LED indicators) adapted to indicate an interconnection state of the corresponding ports 303 with the cable connector 203 are arranged on the distribution framework 102. The plurality of first communication units 202 are respectively detachably secured to the corresponding cable connector 203 and are such configured that the first communication unit 202 is positioned outside the port 303 when the cable connector 203 is inserted into the port 303. The at least a portion of the ports 303 are respectively provided with a corresponding second communication unit 401, wherein the second communication unit 401 and the corresponding first communication unit 202 are configured to communicate with each other in a non-contact manner. Under ideal circumstances, the number of provided second communication units 401 may be the same as the number of ports 303 on the distribution frame 102. To be specific, each of the ports 303 corresponds to a second communication unit 401 (for example, referring to FIGS. 5 to 7). The control module 601 is configured to control and read and write communications between at least a portion of the first communication units 202 and the second communication units 401. In the intelligent cabling management system according to the embodiments of the present invention, the distribution framework 102 may be provided with communication units (for example, the first communication unit 202 and the second communication unit 401 described in the following embodiments) and a control module 602 configured to control communications between the communication units according to actual needs.

As illustrated in FIG. 1A and FIG. 1B, corresponding to at least a portion of the ports 303, installation openings 301 are arranged on the distribution framework 102. To be specific, the installation openings 301 may be arranged at lower parts or upper parts of the ports 303, and may be spaced apart at a specific distance from the ports 303. For example, in the specific embodiment as illustrated in FIG. 1A and FIG. 1B, the installation openings 301 are arranged at the lower parts of the ports 303.

As illustrated in FIGS. 2A to 2B, and FIGS. 3A to 3C, the cable connector 203 is provided with a jacket 201. The jacket 201 is detachably secured to the cable connector 203; and the first communication units are secured to a bottom plate 2014 of the jacket 201, wherein the bottom plate 2014 passes through the installation openings 301 at the corresponding ports.

Figure 3A:
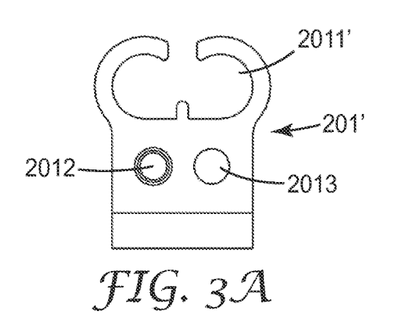
FIG. 3A, FIG. 3B, and FIG. 3C respectively exemplarily illustrate a front view and a three-dimensional view of a jacket for use in a cable connector, and a state view of a pair of jackets in a cabling management system according to an embodiment of the present invention.
Figure 3B:
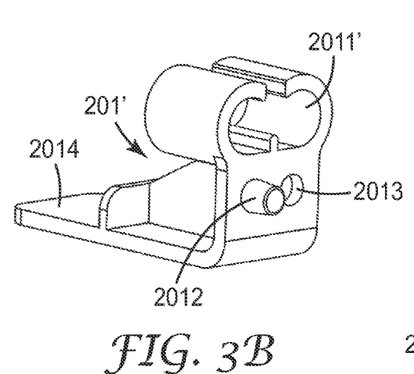
Figure 3C:
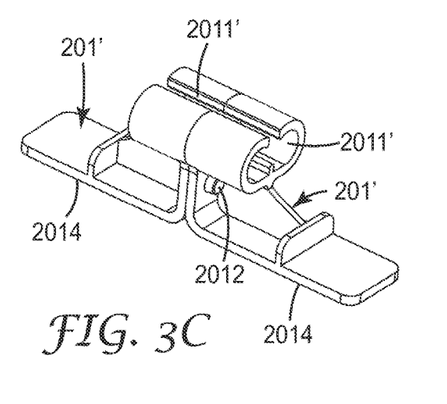

For example, as illustrated in FIGS. 3A to 3C, the jacket 201 may comprise a receiving structure 2011, wherein the receiving structure 2011 may be such configured that the cable connector 203 is at least partially received therein. The receiving structure 2011 may be designed into different shapes adapting to different shapes of the cable connector, such that the cable connector 203 is at least partially received therein. For example, the receiving structure 2011 as illustrated in FIG. 3A and FIG. 3B employs a different shape from the receiving structure 2011 as illustrated in FIG. 3C. In addition, as illustrated in FIGS. 3A to 3C, for ease of managing and differentiating a plurality of cables 204 connected to the distribution framework, a pair of detachably connected jackets 201 are provided for a cable 204 having the cable connector 203 at both ends, wherein the pair of jackets 201 are respectively provided with a pair of the first communication units 202 mating with each other. A pair of jackets 201 may be detachably connected to each other via any suitable mechanical structure. For example, in the embodiment as illustrated in FIGS. 3A to 3C, one of the pair of jackets 201 is provided with a columnar opening 2013 and/or a columnar portion 2012 that are insertable into a columnar portion 2012 and/or a columnar opening 2013 on the other of the pair of jackets 201. To be specific, the pair of jackets 201 may be detachably connected to each other via mating between the columnar opening 2013 and the columnar portion 2012.

Figure 2A:
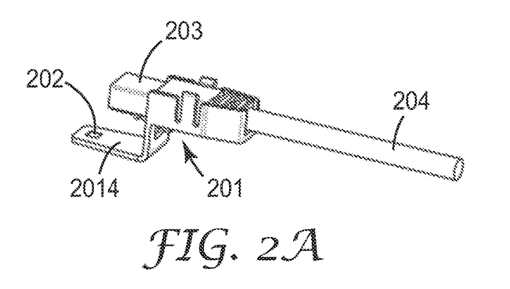
FIG. 2A and FIG. 2B respectively exemplarily illustrate a schematic structural view and an exploded structural view that illustrate a scenario where a first communication unit is installed in a cable connector via a jacket in a cabling management system according to an embodiment of the present invention.
Figure 2B:
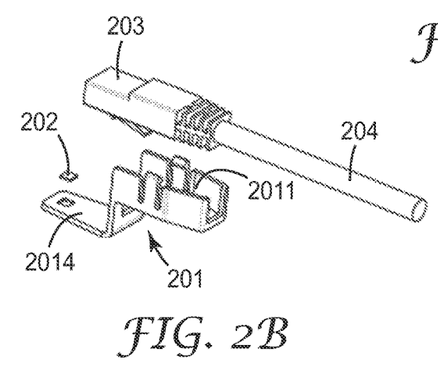
Figure 4:
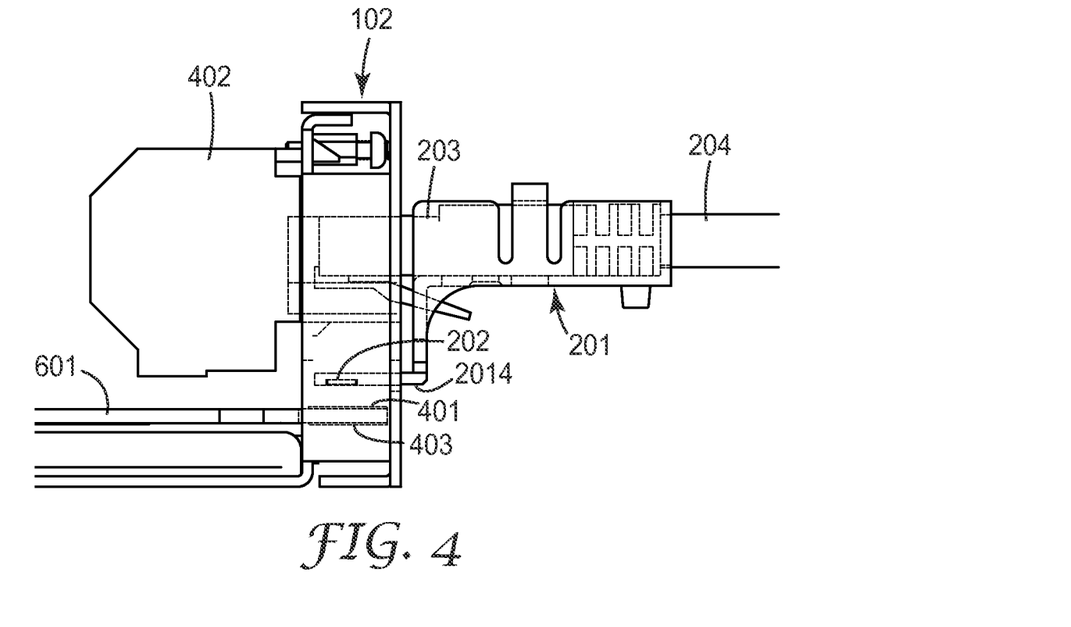
FIG. 4 exemplarily illustrates a schematic structural view of relative positions between a first communication unit and a second communication unit at one port in a distribution framework in a cabling management system according to an embodiment of the present invention.
Figure 5:
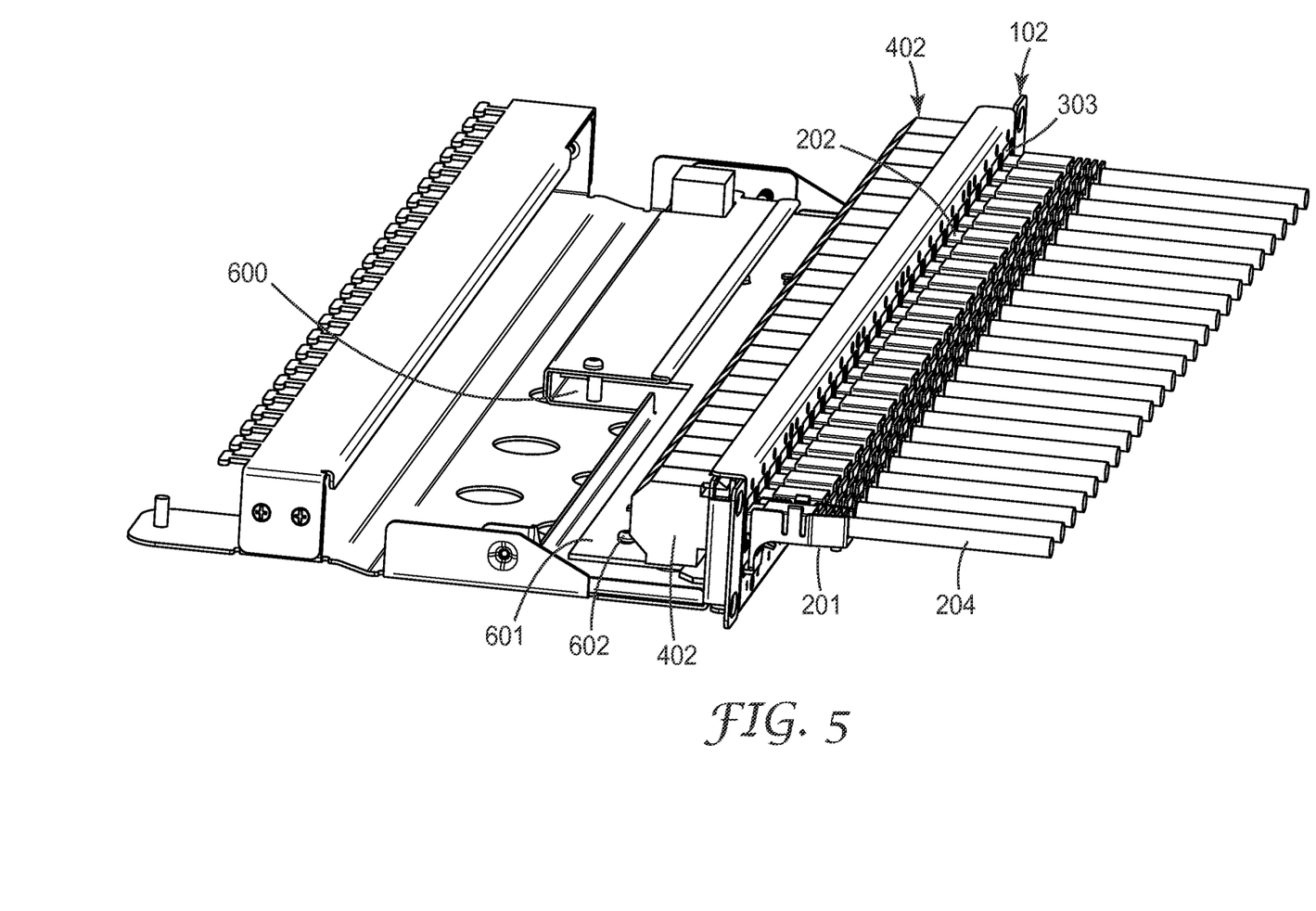
FIG. 5 exemplarily illustrates a schematic structural view illustrating a scenario where a first communication unit and a cable connector in a cabling management system are both installed in a distribution framework according to an embodiment of the present invention.

According to some specific embodiments of the present invention, as illustrated in FIGS. 2A to 2B and FIG. 4, in an intelligent cabling management system, the first communication unit 202 is a radio frequency identification tag and the second communication unit 401 is a radio frequency identification antenna, wherein the radio frequency identification tag 202 and the radio frequency identification antenna 401 communicate with each other via the radio frequency technology.

In the specific embodiment as illustrated in the drawing, the first communication unit 202 (the radio frequency identification tag) is arranged on the cable connector 203 via the jacket 201 (referring to FIG. 2A and FIG. 2B). Therefore, when the cable connector 203 is inserted into the port 303 on the distribution framework 102, the first communication unit 202 (the radio frequency identification tag) is simultaneously installed in the installation opening 301 on the distribution framework 102. In this case, the first communication unit 202 (the radio frequency identification tag) is arranged outside a metal adapter 402 corresponding to the cable connector 203. In this way, although the metal adapter 402 is employed, since the first communication unit 202 (the radio frequency identification tag) is arranged outside the metal adapter 402, radio frequency signals therefrom may not be shielded by the metal adapter 402.

In addition, as illustrated in FIGS. 2A and 2B and FIG. 4, since the first communication unit 202 (the radio frequency identification tag) is arranged on the jacket 201, the first communication unit 202 (the radio frequency identification tag) may be conveniently installed in the cable connector 203 without removing the cable 204 and the cable connector 203 from the port 303. In some embodiments, as illustrated in FIG. 4, to strengthen radio frequency signals, a signal strengthening element 403 made of a ferrite material may be additionally arranged at a lower part of the second communication unit 401 (the radio frequency identification antenna). In this way, a read-write distance of the second communication unit 401 (the radio frequency identification antenna) may be increased, and thus impacts caused by the metal adapter 402 to the radio frequency signals may be reduced.

Figure 6:
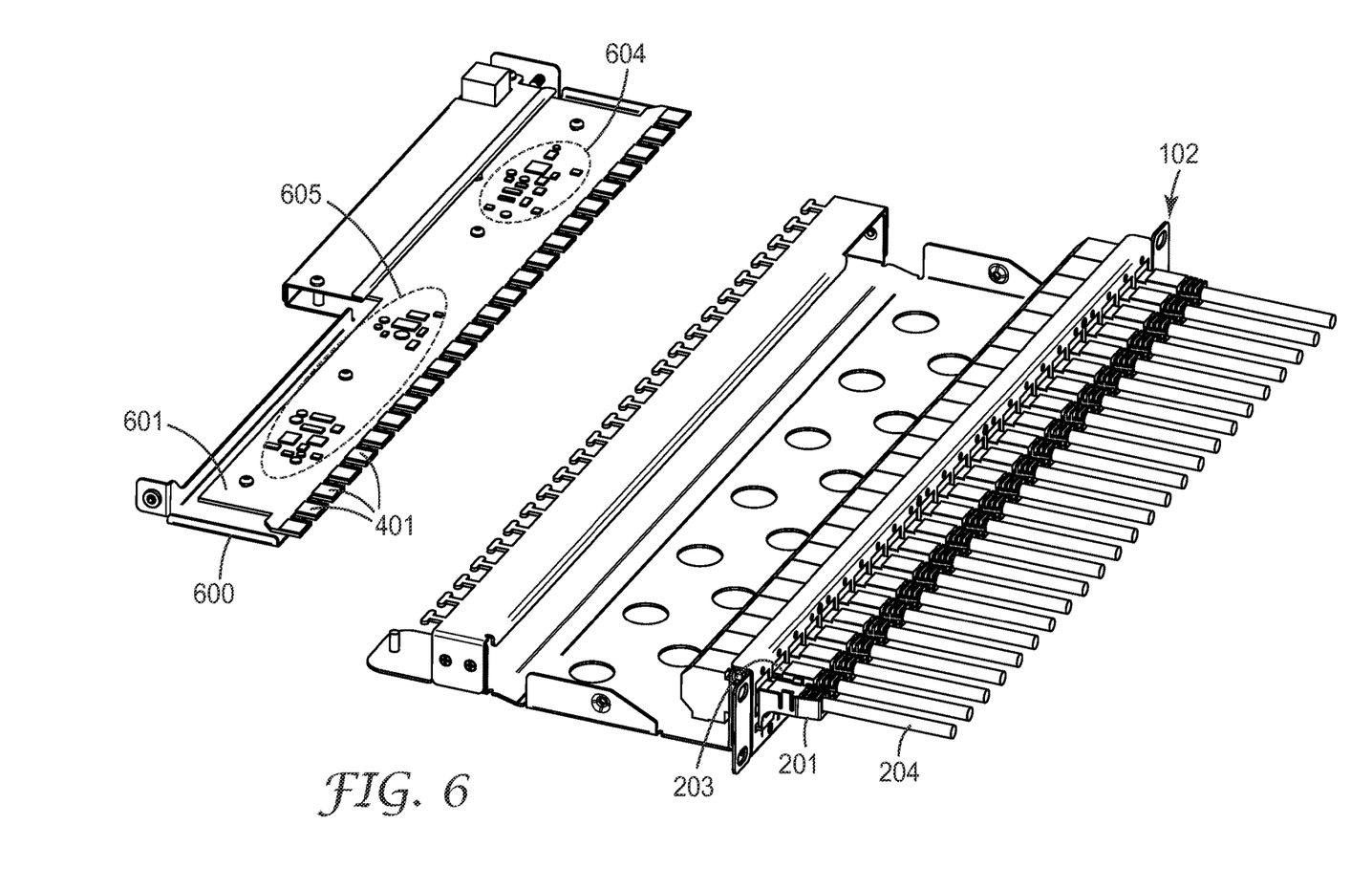
FIG. 6 exemplarily illustrates a schematic structural view illustrating a scenario where a control module is not installed in a distribution framework in a cabling management system according to an embodiment of the present invention.
Figure 7:
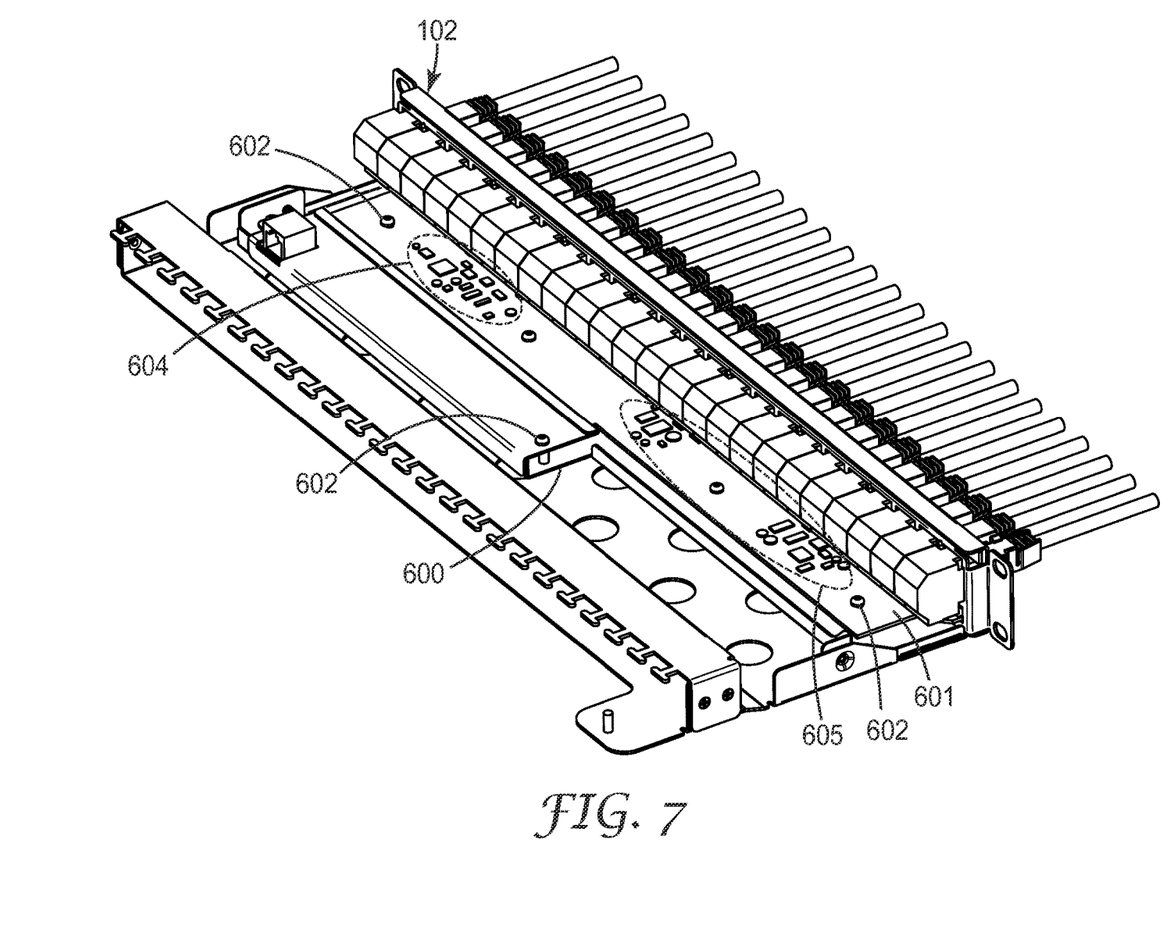
FIG. 7 exemplarily illustrates a schematic structural view illustrating a scenario where a control module is installed in a distribution framework in a cabling management system according to an embodiment of the present invention.

As illustrated in FIG. 6 and FIG. 7, in the intelligent cabling management system, the control module 601 comprises a read-write circuit 604 and a control circuit 605. The read-write circuit 604 is connected to the plurality of second communication units 401 and configured to read information from the first communication units 202 and/or write information into the first communication units 202. The control circuit 605 is connected to the read-write circuit 604 and configured to control communications between the second communication units 401 and the first communication units 202, and control information reading and writing by the read-write circuit 604 for the first communication units 202. As such, as described above, the control module 601 is configured to control and read and write communications between the first communication units 202 and the second communication units 401. In addition, the control circuit 605 may be further configured to control enabling and disabling of the indicator elements 304, thereby facilitating practical operations for the on-site operation personnel.

Further, the above cabling management system further comprises a control unit 101. The control unit 101 communicates with the control module 601 and is configured to perform management of the control module 601. In addition to performing the management of the control module 601, the control unit 101 is further configured to perform management of the distribution framework 102. For example, the control unit 101 may be configured to supply power for the indicator element 304 and the control module 601 on the distribution framework 102.

According to the intelligent cabling management system provided in the embodiment of the present invention, the control module 601 and the second communication unit 401 are detachably secured to the distribution framework 102. In some specific embodiments, the control module 601 and the second communication unit 401 are arranged on an installation plate 600, wherein the installation plate 600 is detachably secured to the distribution framework 102.

According to the intelligent cabling management system provided in the embodiment of the present invention, where necessary, the control module 601 where the second communication unit 401 (the radio frequency identification antenna), the read-write circuit 604, and the control circuit 605 are arranged may be mechanically detachably installed on the distribution framework 102. For example, in the embodiments as illustrated in FIG. 6 and FIG. 7, the control module 601 is conveniently installed on the distribution framework 102 via a securing member 602 such as a buckle or a screw. Through the above design, the control module 601 may be arranged independently of the distribution framework 102 in terms of mechanical structure, and lay a design basis for the upgradeable distribution framework 102 according to the present invention.

Figure 8:
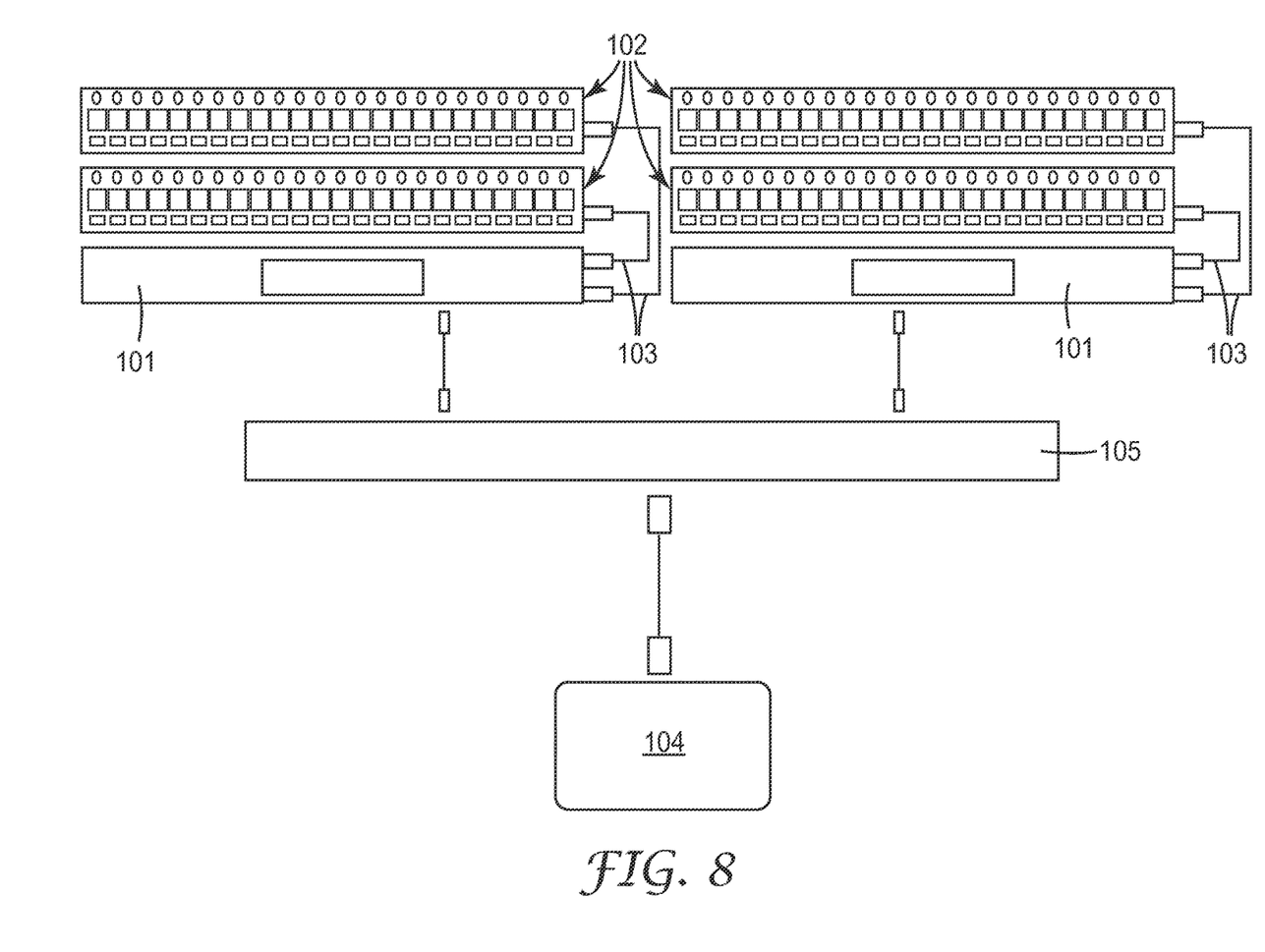
FIG. 8 exemplarily illustrates an overall architectural view of a cabling management system according to an embodiment of the present invention.

Referring to FIG. 8, in the intelligent cabling management system for use in network cabling provided in the embodiment of the present invention, in addition to the above described intelligent control unit 101 and the distribution framework 102, the system may further comprise a central management unit 104. The central management unit 104 is configured to control the control unit 101 in a network communication manner such as an Ethernet 105, and has a human-computer interaction function. For example, the central management unit 104 is responsible for sending instruction information for the intelligent control unit 101. In the meantime, the intelligent control unit 101 is connected to the distribution framework 102 via a cable 103, and is responsible for performing management of the distribution framework 102 according to the instruction information. As illustrated in FIG. 8, the intelligent control unit 101 may be simultaneously connected to a plurality of distribution frameworks 102 and manage these distribution frameworks 102.

In addition, an embodiment of the present invention further provides an upgradeable distribution framework 102. As illustrated in FIG. 1A and FIG. 1B, the distribution framework 102 has a plurality of ports 303 adapted to be connected to a cable connector 203, wherein corresponding to the ports 303, installation openings 301 and indicator elements 304 (for example, LED indicators) adapted to indicate an interconnection state of the corresponding ports 303 with the cable connector 203 are arranged on the distribution framework 102. To be specific, the installation openings 301 may be arranged at lower parts or upper parts of the ports 303, and may be spaced apart at a specific distance from the ports 303. The installation opening 301 is adapted to pass a portion of a structure corresponding to the jacket 201 of the corresponding port 303 and having the first communication unit 202 (for example, the radio frequency identification tag in the embodiment as illustrated in the drawing) through the installation opening 301, such that the first communication unit 202 is positioned outside the port 303. In this way, the first communication unit 202 (the radio frequency identification tag) is arranged outside a metal adapter 402 corresponding to the cable connector 203.

As illustrated in FIG. 6 and FIG. 7, the distribution framework 102 may further comprise an installation plate 600, and a plurality of second communication units 401 (the radio frequency antennas in the embodiment as illustrated in the drawing) and one or a plurality of control modules 601 that are installed on the installation plate 600, wherein the installation plate 600 is detachably secured to the distribution framework 102. At least a portion of the second communication units 401 respectively correspond to one of the ports 303, and the second communication units 401 (the radio frequency identification antennas) and the corresponding first communication units 202 (the radio frequency identification tags) are configured to communicate with each other in a non-contact manner; and the control module 601 is configured to control and read and write communications between at least a portion of the first communication units 202 and the second communication units 401.

The second communication units 401 (the radio frequency identification antennas) are arranged on the control module 601, and each of the first communication units 202 (the radio frequency identification tag) and the corresponding second communication unit 401 (the radio frequency identification antenna) communicate with each other in a non-contact manner (the radio frequency technology in this embodiment). The read-write circuit 604 is connected to a plurality of second communication units 401 (the radio frequency identification antennas) and configured to read information from the first communication units 202 (the radio frequency identification tags) and/or write information into the first communication units 202 (the radio frequency identification tags). The control circuit 605 is configured to control communications between the second communication units 401 (the radio frequency identification antennas) and the first communication units 202 (the radio frequency identification tags), and control information reading and writing by the read-write circuit 604 for the second communication units 401 (the radio frequency identification antennas).

Preferably, in the upgradeable distribution framework 102 provided in the embodiment of the present invention, the control circuit 605 may be further configured to control enabling and disabling of the indicator elements 304 (the LED indicators in this embodiment), thereby facilitating practical operations for the on-site operation personnel.

Preferably, in the upgradeable distribution framework 102 provided on the embodiment of the present invention, as illustrated in FIG. 4, to strengthen radio frequency signals, a signal strengthening element 403 made of a ferrite material may be additionally arranged at a lower part of the second communication unit 401 (the radio frequency identification antenna). In this way, a read-write distance of the second communication unit 401 (the radio frequency identification antenna) may be increased, and thus impacts caused by the metal adapter 402 to the radio frequency signals may be reduced.

For other descriptions and introductions of the upgradeable distribution framework 102, reference may be made to the detailed description and illustration given above for the intelligent cabling management system, which are not described herein any further.

In addition, as illustrated in FIGS. 2A to 2B and FIGS. 3A to 3C, an embodiment of the present invention provides a cable connector 203 for use in the above described upgradeable distribution framework 102. The cable connector 203 comprises a body and a jacket 201. The body is configured to be in communication with a port 303 on a distribution framework to implement data communication, and the jacket 201 is detachably installed on the body of the cable connector 203. To be specific, the jacket 201 comprises a receiving structure 2011 and a bottom plate 2014 arranged parallel with the receiving structure 2011, wherein the receiving structure 2011 is configured to receive at least partially the body of the cable connector 203 therein. In addition, the bottom plate 2014 is provided with a first communication unit 202 (the radio frequency identification tag in the embodiment as illustrated in the drawing). As described above, a pair of detachably connected jackets 201 are provided for a cable 204 having the cable connector 203 at both ends, wherein the pair of jackets 201 are respectively provided with a pair of the first communication units 202 (the radio frequency identification tags) mating with each other. For example, one of the pair of jackets 201 is provided with a columnar opening 2013 and/or a columnar portion 2012 that are insertable into a columnar portion 2012 and/or a columnar opening 2013 on the other of the pair of jackets 201. For other descriptions and introductions of the cable connector 203, reference may be made to the detailed description and illustration given above for the intelligent cabling management system and the upgradeable distribution framework, which are not described herein any further.

As seen from the above, according to the intelligent cabling management system, the upgradeable distribution framework, and the cable connector used therefor provided in the embodiments of the present invention, when users fail to employ an entire intelligent cabling management system in the initial deployment of the cabling system due to such factors as budgets or technical concepts, the user may use common cables 204 and cable connectors 203 thereof, and the distribution framework 102 having indicator elements 304 and installation openings 301 provided in the embodiments of the present invention, and implement traditional cabling management. This may effectively reduce the costs for the users. Where an intelligent cabling management system is desired in the future, the users only need to install jackets 201 having a first communication unit 202 (radio frequency identification tag) to cable connectors 203 connected to the distribution framework 102, and meanwhile install control modules 601 having a second communication unit 401 (radio frequency antenna), a read-write circuit 604, and a control circuit 605 to the distribution framework 102 in a securing manner via a securing member 602. As such, the users may implement upgrade of the distribution framework 102 without causing an interruption to the network connection. In addition, management and control may be implemented by using a peripheral intelligent control unit 101 and central management unit 104. In this way, the traditional distribution framework may be conveniently, quickly, reliably, and stably upgraded to the intelligent cabling management system according to the embodiments of the present invention. In addition, since the second communication unit 401 (the radio frequency identification tag) is arranged outside a metal adapter 402, radio frequency signals may not be shielded by the metal adapter 402. Further, according to actual needs, a signal strengthening element made of a ferrite material may be additionally arranged on the second communication unit 401 (the radio frequency identification antenna) or the first communication unit 202 (the radio frequency identification tag), to increase a read-write distance of the radio frequency identification antenna 401 and reduce impacts caused by the metal adapter to the radio frequency signals.

Therefore, the intelligent cabling management system provided in the embodiments of the present invention is capable of performing a large amount of data processing without the need of paper documents, and thus effectively reduces the occurrence rate of human mistakes and the workload. In addition, the intelligent cabling management system provided in the present invention may further monitor states of the ports, and collect statistics for the usage ratio of the ports, thereby fully using the ports. If detecting an unauthorized or exceptional operation, the system may generate a warning to prohibit the exceptions.

The above described specific embodiments of the present invention merely illustratively describe the principles and effects of the present invention, and are not intended to limit the present invention. A person skilled in the art shall understand that any variations and improvements made to the present invention without departing from the spirit and scope of the present invention shall all fall within the scope of the present invention. The protection scope of the present invention shall be defined by the appended claims of the present invention.

What is claimed is:

1. A cabling management system, comprising:
   a distribution framework having a plurality of ports adapted to be connected to a cable connector, wherein the cable connector is provided with a jacket detachably secured to the cable connector; and a plurality of first communication units are secured to a bottom plate of the jacket, the bottom plate passing through installation openings at corresponding ports of the plurality of ports, wherein for at least a portion of the plurality of ports, (i) indicator elements adapted to indicate an interconnection state of the corresponding ports with the cable connector are arranged on the distribution framework, and (ii) the installation openings are arranged on the distribution framework, the installation openings being arranged at lower parts or upper parts of the plurality of ports and spaced apart at a specific distance from the plurality of ports;
   the plurality of first communication units detachably secured to the cable connector being configured such that each first communication unit is positioned outside a corresponding port of the plurality of ports when the cable connector is inserted into the corresponding port;
   a plurality of second communication units, wherein at least a portion of the plurality of second communication units respectively correspond to ports of the plurality of ports, each second communication unit corresponding to a different first communication unit and being configured to communicate with each other in a non-contact manner; and
   a control module configured to control and to read and write communications between, at least a portion of the plurality of first communication units and the plurality of second communication units.

2. The system according to claim 1, wherein the jacket comprises a receiving structure configured such that the cable connector is at least partially received in the receiving structure.

3. The system according to claim 2, wherein a pair of detachably connected jackets is provided for a cable having the cable connector at both ends, the pair of detachably connected jackets being respectively provided with a pair of first communication units of the plurality of first communication units mating with each other.

4. The system according to claim 3, wherein one jacket of the pair of detachably connected jackets is provided with a columnar opening and/or a columnar portion that are insertable into a columnar portion and/or a columnar opening on the other jacket of the pair of detachably connected jackets.

5. The system according to claim 1, where the control module comprises:
   a read-write circuit connected to the plurality of second communication units and configured to read information from the plurality of first communication units and/or write information to the plurality of first communication units; and
   a control circuit connected to the read-write circuit and configured to control communications between the plurality of second communication units and the plurality of first communication units, and control information reading and writing by the read-write circuit for the plurality of first communication units.

6. The system according to claim 1, wherein the control module and the plurality of second communication units are detachably secured to the distribution framework.

7. The system according to claim 1, wherein the control module and the second communication unit are arranged on an installation plate, the installation plate being detachably secured to the distribution framework.

8. The system according to claim 5, wherein the control circuit is further configured to control enabling and disabling of the indicator elements.

9. The system according to claim 1, wherein the first communication unit of the plurality of the first communication units is a radio frequency identification tag, and each second communication unit of the plurality of second communication units is a radio frequency identification antenna.

10. The system according to claim 1, wherein one second communication unit of the plurality of second communication units and one first communication unit of the plurality of first communication units are further provided with a signal strengthening element.

11. The system according to claim 10, wherein the signal strengthening element comprises a ferrite layer.

12. The system according to claim 1, further comprising:
a control unit communicating with the control module and configured to perform management of the control module.

13. The system according to claim 12, wherein:
the control unit is further configured to supply power for the indicator elements and the control module.

14. The system according to claim 12, further comprising:
a central control unit configured to control the control unit in a network communication manner, and having a human-computer interaction function.

15. A cable connector, comprising a body configured to be in communication with a port on a distribution framework to implement data communication, wherein the cable connector further comprises a jacket, the jacket being detachably installed on the body of the cable connector, wherein the jacket comprises a receiving structure and a bottom plate arranged parallel with the receiving structure, the receiving structure being configured to receive at least partially the body of the cable connector in the receiving structure, and wherein the bottom plate is provided with a first communication unit, the first communication unit comprising a radio frequency identification tag, wherein a pair of detachably connected jackets is provided for a cable having the cable connector at both ends, the pair of detachably connected jackets being respectively provided with a pair of first communication units mating with each other.

16. The cable connector according to claim 15, wherein one jacket of the pair of detachably connected jackets is provided with one of a columnar opening and a columnar portion that are insertable into a corresponding columnar portion or columnar opening on the other jacket of the pair of detachably connected jackets.

17. An upgradeable distribution framework, the upgradeable distribution framework having a plurality of ports adapted to be connected to a cable connector, wherein corresponding to at least a portion of the plurality of ports, installation openings and indicator elements adapted to indicate an interconnection state of corresponding ports with the cable connector are arranged on the distribution framework, the installation openings being arranged at lower parts or upper parts of the plurality of ports and spaced apart at a specific distance from the plurality of ports, wherein the installation openings are adapted to pass a portion of a structure corresponding to a jacket of the corresponding port and having a first communication unit through the installation openings, such that the first communication unit is positioned outside the corresponding port.

18. The upgradeable distribution framework according to claim 17, further comprising an installation plate and a plurality of second communication units and one or more control modules of a plurality of control modules that are arranged on the installation plate, wherein:
the installation plate is detachably secured to the upgradeable distribution framework;
a plurality of first communication units are provided, with each first communication unit having a corresponding second communication unit of the plurality of second communication units;
at least a portion of the plurality of second communication units respectively correspond to one of the plurality of ports, and the at least a portion of the plurality of second communication units and the corresponding first communication units are configured to communicate with each other in a non-contact manner; and
the control module is configured to control and read and write communications between at least a portion of the plurality of first communication units and the at least a portion of the plurality of second communication units.

19. The system according to claim 9, wherein one second communication unit of the plurality of second communication units and one first communication unit of the plurality of first communication units are further provided with a signal strengthening element.

* * * * *